US006716409B2

(12) United States Patent
Hafner et al.

(10) Patent No.: US 6,716,409 B2
(45) Date of Patent: Apr. 6, 2004

(54) FABRICATION OF NANOTUBE MICROSCOPY TIPS

(75) Inventors: Jason H. Hafner, Houston, TX (US); Chin Li Cheung, Cambridge, MA (US); Charles M. Lieber, Lexington, MA (US)

(73) Assignee: President and Fellows of the Harvard College, Cambridge, MA (US)

( * ) Notice: Subject to any disclaimer, the term of this patent is extended or adjusted under 35 U.S.C. 154(b) by 30 days.

(21) Appl. No.: 09/955,738

(22) Filed: Sep. 18, 2001

(65) Prior Publication Data

US 2002/0112814 A1 Aug. 22, 2002

Related U.S. Application Data

(60) Provisional application No. 60/233,595, filed on Sep. 18, 2000.

(51) Int. Cl.⁷ .................................................. D01F 9/12
(52) U.S. Cl. .............................. 423/447.1; 423/447.2; 423/447.3; 422/55; 73/105
(58) Field of Search ................................ 250/306, 307; 423/447.2, 447.3, 447.1, 445 B, 445 R; 422/55; 73/105

(56) References Cited

U.S. PATENT DOCUMENTS

| | | | |
|---|---|---|---|
| 4,663,230 A | 5/1987 | Tennent | 428/367 |
| 5,165,909 A | 11/1992 | Tennent et al. | 423/447.3 |
| 5,753,088 A | 5/1998 | Olk | 204/173 |
| 5,824,470 A | 10/1998 | Baldeschwieler et al. | 435/6 |
| 5,997,832 A | 12/1999 | Lieber et al. | 423/249 |
| 6,063,243 A | 5/2000 | Zettl et al. | 204/164 |
| 6,099,965 A | 8/2000 | Tennent et al. | 428/408 |
| 6,129,901 A | 10/2000 | Moskovits et al. | 423/447.3 |
| 6,146,227 A | 11/2000 | Mancevski | 445/24 |
| 6,159,742 A | 12/2000 | Lieber et al. | 436/164 |
| 6,203,814 B1 | 3/2001 | Fisher et al. | 424/443 |
| 6,210,800 B1 | 4/2001 | Nesper et al. | 428/367 |
| 6,221,154 B1 | 4/2001 | Lee et al. | 117/87 |
| 6,221,330 B1 | 4/2001 | Moy et al. | 423/447.3 |
| 6,250,984 B1 | 6/2001 | Jin et al. | 445/51 |
| 6,283,812 B1 | 9/2001 | Jin et al. | 445/24 |
| 6,325,909 B1 | 12/2001 | Li et al. | 205/106 |
| 6,401,526 B1 * | 6/2002 | Dai et al. | 73/105 |
| 2002/0085968 A1 * | 7/2002 | Smalley et al. | 422/198 |

FOREIGN PATENT DOCUMENTS

| WO | WO 96/38705 | 12/1996 |
|---|---|---|
| WO | WO 98/05920 | 2/1998 |
| WO | WO 00/09443 | 2/2000 |
| WO | WO 00/66485 | 11/2000 |
| WO | WO 00/73205 A1 | 12/2000 |

OTHER PUBLICATIONS

Kong et al. "Synthesis of indicidual single–walled carbon nanotubes on patterned silicon wafers", Nature vol. 395, Oct. 29, 1988, pp. 878–881.*

Ago et al. "Dispersion of metal nanoparticles for aligned carbon nanotube arrays" Applied Physics Letters vol. 77(1), Jul. 3, 2000, pp. 79–81.*
Wong et al.; "Carbon Nanotube Tips: High–Resolution Probes For Imaging Biological Systems", J. Am. Chem. Soc., 120:603–604, (1998).
Wong et al.; "Covalently Functionalized Nanotubes as Nonometer–sized Probes in Chemistry and Biology", Nature, 394 : 52, (Jul. 2, 1998).
Wang et al.; "Single–walled 4A Carbon Nanotube Arrays", Nature, 408: 50–51, (Nov. 2000).
Wong et al.; "Covalently–Functionalized Single–Walled Carbon Nanotube Probe Tips for Chemical Force Microscopy", J. Am. Chem. Soc. 120: 8557–8558, ( 1998).
Wang et al.; "Atomic Structure and Electronic Properties of Single–Walled Carbon Nanotubes", Nature 391:62–64, (Jan. 1, 1998).
Woolley et al.; "Direct Haplotyping of Kilobase–Size DNA Using Carbon–Nanotube Probes", Nature Biotechnology, 18: 760–763 (Jul. 2000).
Zhang et al.; "Heterostructures of Sigle–Walled Carbon Nanotubes and Carbide Nanorods", Science 285: 1719–1722, (Sep. 10, 1999).
Journet et al.; "Large–scale Production of Single–Walled Carbon Nanotube by the Electric–arc Technique", Nature, 388: 756–758, (Aug. 21, 1997).
Dai et al.; "Nanotubes as Nanoprobes in Scanning Probe Microscopy", Nature 384: 147–150, (Nov. 14, 1996).
Cheung et al.; "Carbon Nanotube Atomic Force Microscopy Tips: Direct Growth by Chemical Vapor Deposition and Application to High–Resolution Imaging", PNAS, 97(8): 3809–3813, (Apr. 11, 2000).
Kelly et al.; "Threefold Electron Scattering on Graphite Observed With $C_{60}$– Adsorbed STM Tips", Science, 273:1371–1373, (Sep. 6, 1996).
Fan et al.; "Self–Oriented Regular Arrays of Carbon–Nanotubes and their Field Emission Properties", Science, 283: 512–514, (Jan. 22, 1999).
Thess et al..; "Crystalline Ropes of Metallic Carbon Nanotubes", Science 273: 483–487, (Jul. 26, 1996).
Hafner et al.; "High–Yield Assembly of Individual Single–Walled Carbon Nanotube Tips for Scanning Probe Microscopies", The Journal of Physical Chemistry B, 105(4): 743–746, (Feb. 1, 2001).
Nikolaev et al.; "Gas–phase Catalitic Growth of Single–Walled Carbon Nanotubes from Carbon Monoxide", Chemical Physics Letters 313: 91–97, (Nov. 5, 1999).

(List continued on next page.)

Primary Examiner—Stuart L. Hendrickson
Assistant Examiner—Peter J Lish
(74) Attorney, Agent, or Firm—Dana M. Gordon; Foley Hoag LLP

(57) ABSTRACT

A method of fabricating SWNT probes for use in atomic force microscopy is disclosed. In one embodiment, the SWNT's are fabricated using a metallic salt solution. In another embodiment, the SWNT's are fabricated using metallic colloids.

21 Claims, 14 Drawing Sheets

OTHER PUBLICATIONS

Sinnott et al.; "Model of Carbon Nanotube Growth Through Chemical Vapor Deposition", Chemical Physics Letters 315: 25–30, (Dec. 17, 1999).

Single–Walled Nanotubes Produced by Metal–Catalyzed Disproportionation of Carbon Monoxide, Chemical Physics Letters 260: 471–475, ( Sep. 27, 1996).

Hafner et al.; "Catalytic Growth of Single–Walled Carbon Nanotubes from Metal Particles", Chemical Physics Letters, 296 : 195–202, (Oct. 30, 1998).

Anderson et al.; "Influence of the Support on the Structural Characteristics of Carbon Nanofibers Produced From the Metal–Catalyzed Decomposition of Ethylene", Chem. Mater 12: 823–830, (2000).

Cheung et al.; "Growth and Fabrication with Single–Walled Carbon Nanotube Probe Microscopy Tips", Applied Physics Letters, 76(21): 3136–3138, (May 22, 2000).

Kyotani et al.; "Formation of Ultrafine Carbon Tubes by Using an Anodic Aluminum Oxide Film as a Template", Chemistry of Materials 7(8): 1427–1428, (Aug. 1995).

Li and Liu; "Preparation of Monodispersed Fe–Mo Nanoparticles as the Catalyst for CVD Synthesis of Carbon Nanotubes", Chem. Mater. 13: 1008–1014, (2001).

Han et al.; "Synthesis of Silicon Nitride Nanorods Using Carbon Nanotube as a Template", Applied Physics Letters 71(16):2271–2273, (Oct. 20, 1997).

Ago et al.; "Dispersion of Metal Nanoparticles for Aligned Carbon Nanotube Arrays", Applied Physics Letters, 77(1): 79–81, (Jul. 3, 2000).

Li et al.; "Highly–Ordered Carbon Nanotube Arrays for Electronic Applications", Applied Physics Letters, 75(3):367–369, (Jul. 19, 1999).

Cheung et al.; "Carbon Nanotube Atomic Force Microscopy Tips: Direct Growth by Chemical Vapor Deposition and Application to High Resolution Imaging", PNAS, 97(8): 3809–3813, (Apr. 11, 2000).

Cheung et al.; "Growth and Fabrication with Single–Walled Carbon Nanotube Probe Microscopy Tips", Applied Physics Letters, 76(21): 3136–3138, (May 22, 2000).

Hafner et al.; "High–Yield Assembly of Individual Single-Walled Carbon Nanotube Tips for Scanning Probe Microscopies", The Journal of Physical Chemistry B, 105(4): 743–746, (Feb. 1, 2001).

Hafner et al.; "Direct Growth of Single–Walled Carbon Nanotube Scanning Microscopy Tips".

Nakayama et al.; "Microprocess for Fabricating Carbon-Nanotube Probes of a Scanning Probe Microscope", J. Vac, Sci. Techn. B, 12(2):661–664, (Mar./Apr., 2000).

Qin et al.; "Growing Carbon Nanotubes by Microwave Plasma–Enhanced Chemical Vapor Deposition", Applied Physics Letters 72(26):3437–3439, (Jun. 29, 1998).

Stevens et al.; "Carbon Nanotubes as Probes for Atomic force Microscopy", Nanotechnology 11: 1–5, (2000).

Database CA 'Online', Chemical Abstracts Service, Columbus Ohio, Database AccessionNo. 133: 181653 CA XP 002187925.

International Search Report Completed on Jan. 22, 2002 and Mailed on Feb. 6, 2002.

* cited by examiner

FABRICATION OF NANOTUBE MICROSCOPY TIPS

RELATED APPLICATION INFORMATION

This application claims the benefit of priority to Provisional Patent Application No. 60/233,595, filed Sep. 18, 2000, which application is hereby incorporated by reference in its entirety.

GOVERNMENT SUPPORT

This invention was made with government support under Grant Nos. F49620-97-1-0005 and F49620-97-1-0084 awarded by the Air Force Office of Scientific Research; and Grant No. GM59666 awarded by the National Institutes of Health. The government has certain rights in the invention.

BACKGROUND OF THE INVENTION

Carbon nanotubes are fullerene-related structures which consist of graphene cylinders closed at either end with caps containing pentagonal rings. They were discovered in 1991 by the Japanese electron microscopist Sumio Iijima who was studying the material deposited on the cathode during the arc-evaporation synthesis of fullerenes. He found that the central core of the cathodic deposit contained a variety of closed graphitic structures including nanoparticles and nanotubes, of a type which had never previously been observed. A short time later, Thomas Ebbesen and Pulickel Ajayan, from Iijima's lab, showed how nanotubes could be produced in bulk quantities by varying the arc-evaporation conditions. This paved the way to an explosion of research into the physical and chemical properties of carbon nanotubes in laboratories all over the world.

A major event in the development of carbon nanotubes was the synthesis in 1993 of single-layer nanotubes. The standard arc-evaporation method produces only multilayered tubes. It was found that addition of metals such as cobalt to the graphite electrodes resulted in extremely fine tube with single-layer walls. The availability of these structures should enable experimentalists to test some of the theoretical predictions which have been made about nanotube properties.

An alternative method of preparing single-walled nanotubes was described by Smalley's group in 1996. Like the original method of preparing $C_{60}$, this method involved the laser-vaporization of graphite, and resulted in a high yield of single-walled tubes with unusually uniform diameters. These highly uniform tubes had a greater tendency to form aligned bundles than those prepared using arc-evaporation, and led Smalley to christen the bundles nanotube "ropes". Initial experiments indicated that the rope samples contained a very high proportion of nanotubes with a specific armchair structure. Subsequent work has suggested that the rope samples may be less homogeneous than originally thought. Nevertheless, the synthesis of nanotube ropes gave an important boost to nanotube research, and some of the most impressive work has been carried out on these samples.

Nanotubes, depending on their structure, can be metals or semiconductors. They are also extremely strong materials and have good thermal conductivity. The above characteristics have generated strong interest in their possible use in nano-electronic and nano-mechanical devices. For example, they can be used as nano-wires or as active components in electronic devices.

Beginning with the early work of Binnig, Rohrer and co-workers, the utility of a direct, physical connection between the macroscopic world and individual objects on the nanoscopic scale has become increasingly evident, both for probing the nature of these objects and as a means of direct manipulation and fabrication. While good progress has been made in controlling the position of the macroscopic probe to sub-angstrom accuracy and in designing sensitive detection schemes, there remains the problem of the tip. Ideally, the tip should be of at least the same molecular precision as the nanoscale object to be probed, and it should maintain this perfection reliably in day-to-day practical use not only under high vacuum but also in air and when probing under water. The currently available tips for scanning force microscopy, SFM, or scanning tunneling microscopy, STM, do at times achieve sub-nanometer resolution, they seldom survive a direct "tip crash" with the surface. Further, it is rarely clear just what the atomic configuration of the tip actually is when the image is taken. Carbon nanotubes, particularly those which are effectively fullerenes of macroscopic length in one dimension but still intrinsically nanoscopic with molecular perfection in the other two dimensions, may offer the solution to this tip problem.

The atomic force microscope (AFM), or scanning force microscope (SFM) was invented in 1986 by Binnig, Quate and Gerber. Like all other scanning probe microscopes, the AFM utilises a sharp probe moving over the surface of a sample in a raster scan. In the case of the AFM, the probe is a tip on the end of a cantilever which bends in response to the force between the tip and the sample. The first AFM used a scanning tunneling microscope at the end of the cantilever to detect the bending of the lever, but now most AFMs employ an optical lever technique.

The cantilever obeys Hooke's Law for small displacements, the interaction force between the tip and the sample can be found. The movement of the tip or sample is performed by an extremely precise positioning device made from piezo-electric ceramics, most often in the form of a tube scanner. The scanner is capable of sub-angstrom resolution in x-, y- and z-directions. The z-axis is conventionally perpendicular to the sample.

Compression occurs when the tip is over the feature trying to be imaged. It is difficult to determine in many cases how important this affect is, but studies on some soft biological polymers (such as DNA) have shown the apparent DNA width to be a function of imaging force.

Interaction forces between the tip and sample are the reason for image contrast with the AFM. However, some changes which may be perceived as being topographical, may be due to a change in force interaction. Forces due to the chemical nature of the tip are probably most important here, and selection of a particular tip for its material can be important. Chemical mapping using specially treated or modified tips is another important aspect of current research.

The aspect ratio (or cone angle) of a particular tip is crucial when imaging steep sloped features. Electron beam deposited tips have been used to image steep-walled features far more faithfully than can be achieved with the common pyramidal tips.

The remarkable structural and mechanical properties of single-walled carbon nanotubes (SWNT) make them ideal atomic force microscopy (AFM) probes. Methods for their fabrication based on chemical vapor deposition (CVD) favor the production of SWNT bundle probes, resulting in poorer resolution than what could be achieved with individual SWNT.

Currently, AFM's limiting technology is arguably its most important—the structure of the probe tip that interacts with the sample. AFM tips are prepared by microfabrication and are pyramidal with ca. 5 nm (silicon) or ca. 50 nm (silicon nitride) radii of curvature at the tip apex, and cone angles of ca. 30 degrees. In many imaging applications, sharper and higher aspect ratio tips are needed. In addition, the atomic structure of the tip is not well characterized and can even change while imaging. Several techniques have been developed to improve tips including FIB etching, electron beam deposition, diamond-like coatings, and the use of small asperities naturally occurring at the tip. While these represent improvements for certain samples and imaging conditions, none provide a tip structure with both high aspect ratio and sub-nm radius of curvature while being chemically stable and mechanically robust.

Previously, nanotube probes have been prepared by manual assembly of pre-formed nanotube material and commercial AFM tips by micromanipulation while viewed with an optical microscope. Although this procedure is laborious and slow, it allowed the early development of nanotube tips including the observation of nanotube buckling, high resolution and high aspect ratio imaging, and chemical modification of the tips for chemical force microscopy. The limitations of manually assembled nanotube tips were addressed by direct growth of nanotubes at the tip apex by chemical vapor deposition (CVD). This process provides individual multiwalled nanotube tips and single-walled nanotube (SWNT) bundle tips, and makes their fabrication much simpler since it can be carried out on many tips at once. The ultimate high-resolution tip would be an individual SWNT tip rather than a bundle.

SUMMARY OF THE INVENTION

In one aspect, the invention provides for a method of fabricating SWNT probes for use in atomic force microscopy, comprising the steps of: growing SWNTs on a substrate using chemical vapor deposition; imaging said substrate using an atomic force microscope comprising a tip; and attaching one of said SWNTs to said tip, thereby producing a tip bearing a SWNT. In one embodiment, the SWNTs are deposited normal to the surface of said substrate. In a further embodiment, the substrate is a silicon wafer.

In another embodiment, growing the SWNTs on a silicon wafer comprises the steps of: depositing on said wafer a metallic catalytic material; placing said silicon wafer in a CVD furnace; and exposing said silicon wafers to a gaseous atmosphere comprising a carbon containing gas. In a further embodiment, the metallic catalytic material is selected from the group consisting of metals, metal oxides, metallic salts, and metallic particles.

In an embodiment, the metallic catalytic material is in solution. In a further embodiment, the metallic catalytic material is selected from the group consisting of ferric salts, nickel salts, cobalt salts, platinum salts, molybdenum salts, and ruthenium salts. In a particular embodiment, the metallic catalytic material is ferric nitrate. In a further embodiment, the solution comprises an alcohol. In an even further embodiment, the alcohol is selected from the group consisting of methanol, ethanol, and isopropanol. In yet a further embodiment, the alcohol is isopropanol.

In one embodiment, the carbon containing gas is ethylene. In a further embodiment, the carbon containing gas is ethylene, the metallic catalytic material is ferric nitrate, and the alcohol is isopropanol.

In one embodiment, imaging the substrate further comprises applying a pulsed electric field.

In another embodiment, growing the SWNTs on a silicon wafer comprises the steps of: treating said silicon wafer with metallic colloid particles; placing said silicon wafer in a CVD furnace; and exposing said silicon wafers to a gaseous atmosphere comprising a carbon containing gas. In an embodiment, the metallic colloid is selected from the group consisting of iron colloids, nickel colloids, cobalt colloids, platinum colloids, molybdenum colloids, and ruthenium colloids. In a particular embodiment, the metallic colloid is an iron colloid.

In an embodiment, the carbon containing gas is ethylene. In another embodiment, the metallic colloids have diameters of about 3–15 nm. In yet another embodiment, the SWNT has a diameter from about 2 nm to about 13 nm. In yet another embodiment, the SWNT has a diameter from about 2 nm to about 9 nm. In another embodiment, the SWNT has a diameter from about 3 nm to about 5 nm.

In an embodiment, the method further comprises a tip bearing an adhesive. In another embodiment, the method further comprises the step of heating said tip bearing a SWNT. In another embodiment, The method comprises treating the tip bearing a SWNT with an electromagnetic field.

In another embodiment, a method of growing carbon nanotubes comprising the steps of: providing a substrate; treating said substrate with a metallic colloid solution; placing said substrate in a CVD furnace; and exposing said substrate to a gaseous atmosphere comprising a carbon containing gas, thereby growing a carbon nanotube on said substrate. In a further embodiment, the carbon nanotube is a SWNT. In a further embodiment, the carbon nanotube is a MWNT. In a further embodiment, the substrate is a silicon wafer. In a further embodiment, the metallic colloid is selected from the group consisting of iron colloids, nickel colloids, cobalt colloids, platinum colloids, molybdenum colloids and ruthenium colloids. In a particular embodiment, the metallic colloid is an iron colloid. In a particular embodiment, the carbon containing gas is ethylene. In another particular embodiment, the metallic colloids have diameters of about 3–15 nm. In another particular embodiment, the solution comprises an organic solvent. In yet another embodiment, the solution comprises toluene.

DETAILED DESCRIPTION OF THE INVENTION

Figure 1:
FIG. 1 depicts an AFM image of isolated, 0.8–3 nm diameter nanotubes on the silicon surface; the catalyst particles are also visible; and the scale bar is 100 nm.

One aspect of the present invention relates to various strategies for attaching nanotube tips to silicon tips used in atomic force microscopy (AFM). A second aspect of the present invention relates to an assembly method to fabricate individual SWNT atomic force microscopy probes from wafers with isolated, approximately vertically aligned SWNT prepared by CVD with a high yield. In one embodiment, the probes are prepared with about 100% yield, about 90% yield, or about 80% yield. In another embodiment, the fabricated probes comprise a SWNT tip greater than about 5 angstroms in diameter. In another embodiment, the fabricated probes comprise a SWNT tip greater than about 8 angstroms in diameter. In another embodiment, the fabricated probes comprise a SWNT tip greater than about 1 nm in diameter. In another embodiment, the fabricated probes comprise a SWNT tip greater than about 2 nm in diameter. Additionally, an etching procedure is described that allows control over the length of the nanotube with 2 nanometer resolution.

A single walled carbon nanotube (SWNT), which is a cylindrical graphene sheet rolled from one side to the opposite, forming a cylinders with diameters ranging 0.1 to 50 nanometers and lengths of many microns, may be used as an AFM tip. These nanotubes may provide a combination of high resolution and high aspect ratio imaging which may be due to a possibly large Young's modulus. In addition, carbon nanotubes may elastically buckle rather than fracture under large loads, which makes them highly robust as AFM probes. In contrast to SWNTs, multi-walled carbon nanotubes (MWNTs) have multiple walls of cylindrical graphene sheets rolled from one side to the opposite.

In one embodiment, a hybrid CVD/assembly method is provided for the facile production of individual SWNT tips, with about 100% yield, from silicon wafers containing individual SWNT arranged normal to the surface.

In an embodiment, isolated SWNT are grown on a substrate by CVD so that they are arranged approximately normal to the substrate surface. In one embodiment, the substrate is a ceramic or ceramic oxide. In another embodiment, the substrate may comprise silicon, silicon oxide, alumina, or aluminum oxide. In a particular embodiment, the substrate is a silicon wafer.

The isolated SWNTs are grown on the surface of the substrate by applying to the substrate a catalytic material. In one embodiment, the catalytic material may be a metal, a metal oxide, a metal particle, a metal oxide particle, or a combination of two or more of these components. In a particular embodiment, the metal is a Group VIII transition metal. In another embodiment, the metal is selected from the group consisting of iron, ruthenium, nickel, cobalt, platinum, and molybdenum. In yet another embodiment, the metal oxide comprises a metal selected from the group consisting of iron, ruthenium, nickel, cobalt, platinum, and molybdenum.

In yet another embodiment, the catalytic material is a metallic salt. In another embodiment, the metallic salt is selected from the group consisting of iron, nickel, cobalt, platinum and molybdenum salts. In one embodiment, the salt is a nitrate salt. In a particular embodiment, the metallic salt is ferric nitrate.

In another embodiment, the catalytic material may be ferric chloride, ferric acetate, ferric citrate, ferrous sulfate, ferrous perchlorate, ferrous oxide, ferric oxide, ferrosoferric oxide, or ferric hydroxide, and cobaltous nitrate.

In one embodiment, a very thin layer of a metal, metallic particle or metal oxide may be deposited onto the wafer. The metal, metallic particle or metal oxide may be deposited by applying it to the surface using evaporation techniques, dipping, electrodeposition, or other methods known to those skilled in the art. In a particular embodiment, a silicon wafer is dipped into a solution comprising a metallic salt and alcohol. In one embodiment the alcohol is selected from the group consisting of methanol, ethanol, and propanol. In a particular embodiment, the alcohol is isopropanol.

Figure 6A:
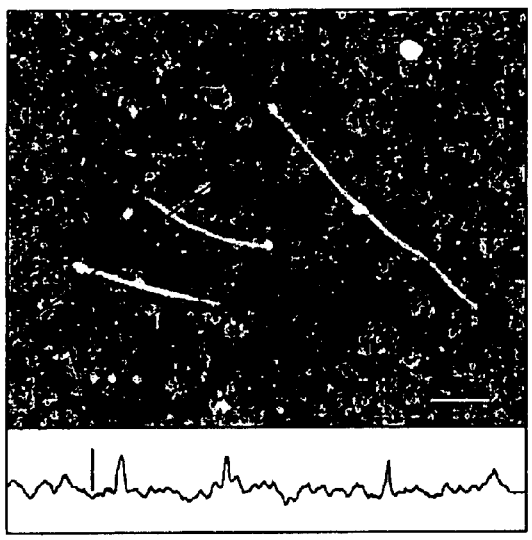
FIG. 6a depicts an AFM image of an isolated SWNT wafer, with a scale bar of 100 nm. The cross section at the blue line is shown in the bottom panel. The vertical bar represents 1 nm, indicating sub-nanometer diameters for these nanotubes.
Figure 6B:
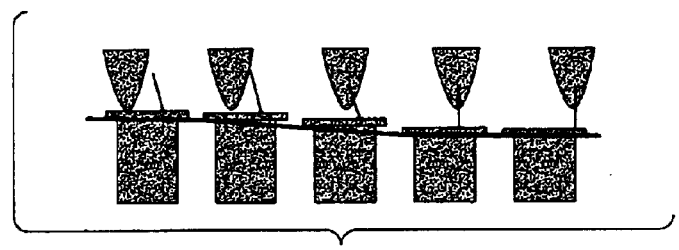
FIG. 6b depicts a model representing the nanotube fabrication process. The line represents the Z-piezo position and demonstrates the step-like behavior
Figure 6C:
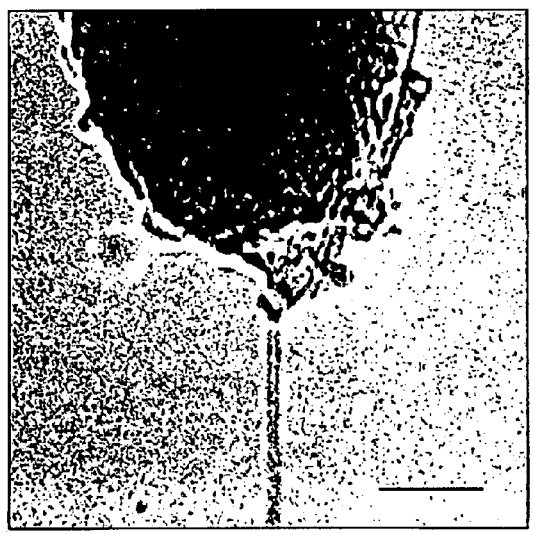
FIG. 6c depicts a TEM image of a sub-nanometer SWNT AFM tip. The scale bar, 10 nm.
Figure 7:
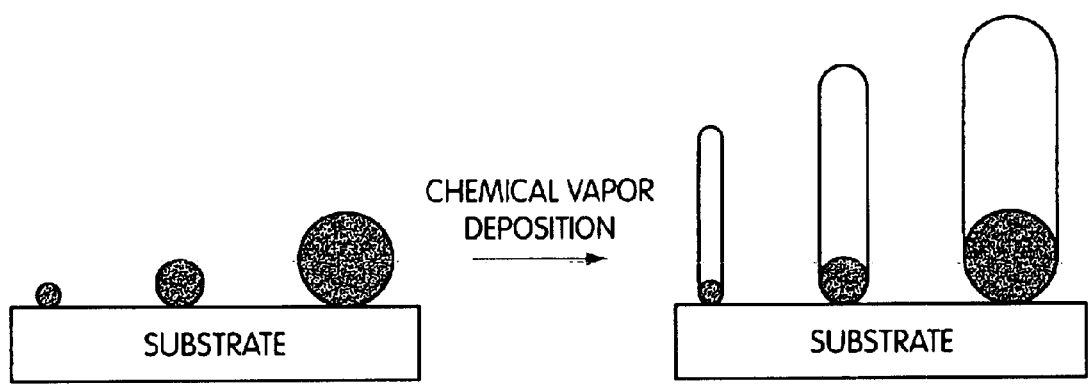
FIG. 7 depicts a schematic for the diameter-controlled growth of carbon nanotubes with different diameter sizes of mono-dispersed iron catalytic nanoparticles by chemical vapor deposition
Figure 8A:
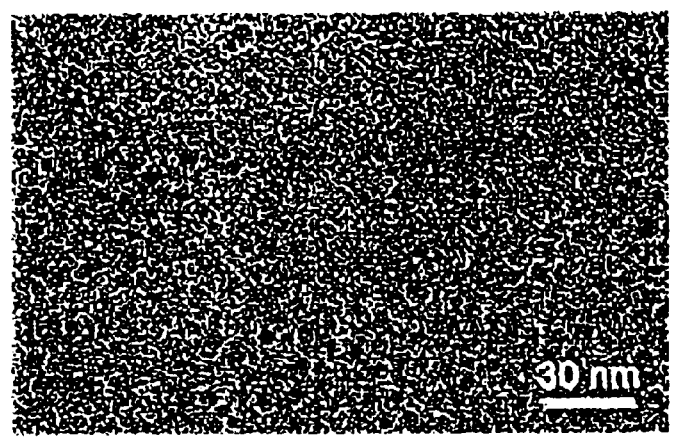
FIG. 8 depicts iron catalytic nanoparticles produced by solution-phase synthesis. TEM micrographs show that the as-produced iron particles are uniform in size (a), b), and c)). Next to the micrographs are the corresponding statistics from TEM and AFM data. The diameter distributions of 3 different sizes of iron colloid synthesized are 3.2+/−0.8 nm, 9.0+/−0.9 nm, and 12.6+/−1.7 nm (d), e) and f)) respectively, with scale bars are 30 nm.
Figure 8B:
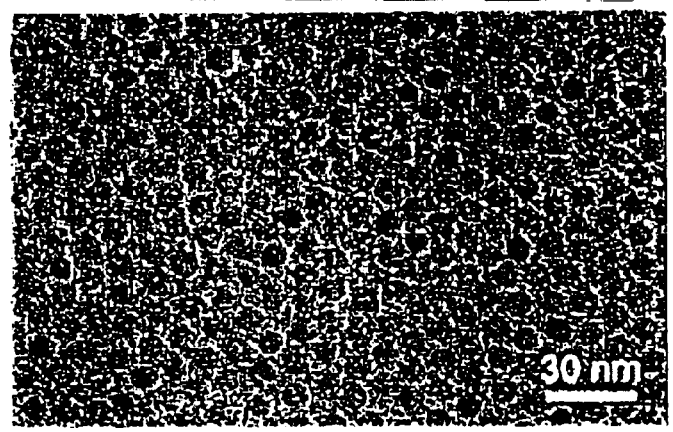
Figure 8C:
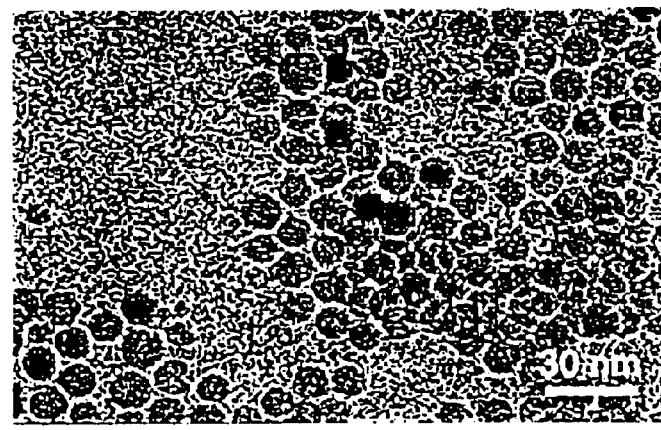
Figure 8D:
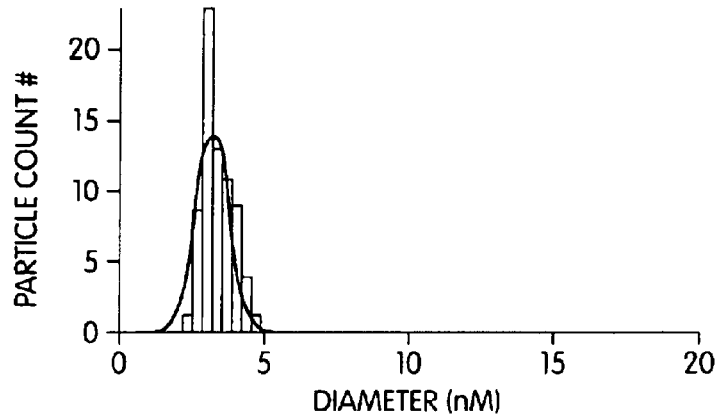
Figure 8E:
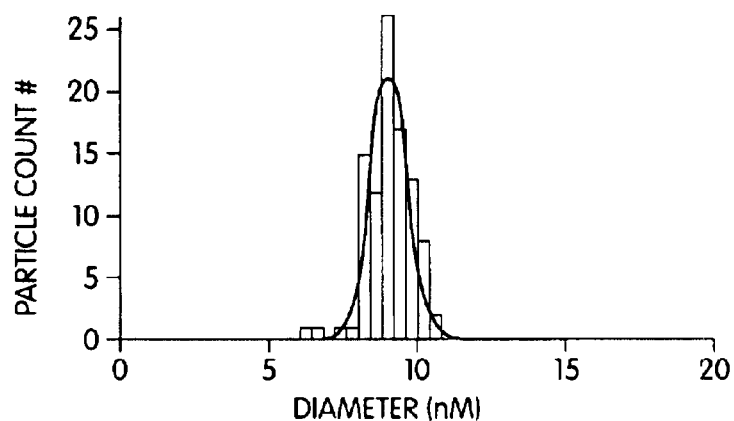
Figure 8F:
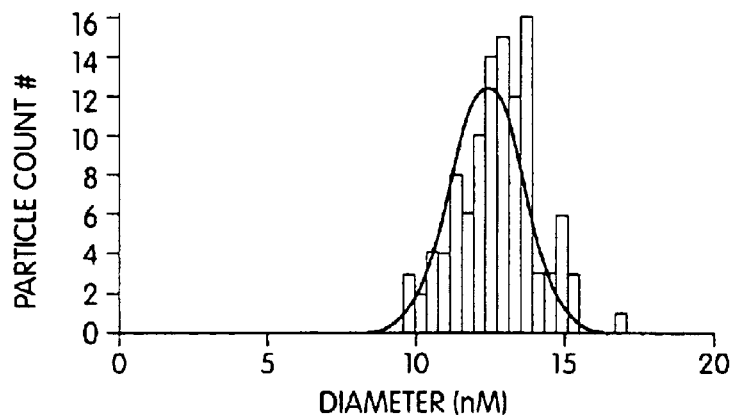

In certain embodiments, the silicon wafer is placed in a CVD furnace and nanotube growth is carried out under a flow of inert gas and a carbon-containing gas, at a temperature of about 700–800 C., conditions known to favor SWNT growth. In a particular embodiment, the carbon-containing gas is selected from the group consisting of alkylene gases, carbon dioxide, and carbon monooxide. In a particular embodiment, the carbon-containing gas is ethylene. In a further particular embodiment, the silicon wafer is placed in a CVD furnace and nanotube growth is carried out under a flow of about 600 sccm Ar, about 400 sccm $H_2$, and about 0.5 sccm ethylene at 700–800 C., conditions known to favor SWNT growth. AFM images of the silicon wafer processed in this way indicate that it is covered with isolated nanotubes that are about 500 nm long with heights less than about 1 nm (FIG. 6a). While many nanotubes are found lying flat on the substrate, as seen in the AFM image, there are also similar nanotubes protruding from the surface. During AFM imaging of these wafers, the Z-piezo position, which is controlled by a feedback loop to hold the sample at a set position relative to the tip, may suddenly step to a lower value and continue to image normally. Since the wafer surface has no step-like features, this behavior may be attributed to the tip suddenly becoming effectively longer (FIG. 6b). After a step event, an individual SWNT may be found on the tip by observing its buckling behavior in force calibration curves and directly from transmission electron microsopy (TEM) images of the tip (FIG. 6c).

In another embodiment, diameter controlled carbon nanotubes are made using metallic colloids with CVD. In one embodiment, different size ranges of metallic colloid catalytic particles were produced with ligand alkanoic acids or alkenoic acids of different chain lengths. In one embodiment, the metallic colloid catalytic particles are selected from the group consisting of iron, nickel, cobalt, platinum, molybdenum, and ruthenium colloid catalytic particles. For example, the carboxyl groups of the ligand coordinate the metal, e.g., iron, whereas the hydrophobic tails interact with each other to form a cap layer for the iron particle. The ligand may comprise an alkyl moiety or an aminoalkyl moiety. The organic chain length of the ligand may increase from 8 carbon atoms (octanoic acid), to 12 carbon atoms (lauric acid) to 18 carbon atoms (oleic acid); moreover, smaller iron particles of diameter sizes from 12.6+/−1.7 nm, 9.0+/−0.9 nm, to 3.2+/−0.8 nm can be produced (FIG. 8). The size distributions of the metallic particles may be further optimized by size precipitation or size focusing techniques such as injection.

In one embodiment, a substrate such as a silicon wafer is dipped into a metallic colloid solution comprising a metallic colloid and a solvent. The solvent may be any high boiling point solvent, e.g., toluene, or dioctyl ether.

Chemical vapor deposition with appropriate flux of hydrocarbon gas and iron nanoparticles successfully catalyzed the growth of carbon nanotubes with diameters defined by the sizes of catalytic particles (FIG. 9). Iron particles of diameters 3(3.2+/−0.8) nm produced SWNTs of diameters 2.6+/−0.8 nm. Similar to CVD nanotubes grown using other catalyst systems, a fraction of the as-grown nanotubes are double-walled carbon nanotubes (DWNTs) with similar diameter range. TEM studies show that the cap shape of an as-grown carbon nanotube from 3 nm catalyst can be either conical (FIG. 9a inset), round or flat. Under AFM, most of these as-grown SWNTs appeared to be straight over hundreds of nm in length. However, as the catalyst size increases, a mixture of SWNTs and thin-walled MWNTs with wall thickness from 2 to 12 graphene sheets may be obtained. For iron particles of diameters 9(9.0+/−0.9) nm, the CVD process at 800° C. produced a mixture of SWNTs and MWNTs with diameters of 7.3+/−2.2 nm. The iron particles with largest diameter range of 13 (12.6+/−1.7) nm catalyzed the growth of only MWNTs with diameters of 11.7+/−3.2 nm at 800° C. Usually, the diameter of as-grown SWNTs produced with the medium size catalyst was less than 7 nm. Under TEM, the morphology of as-grown large diameter carbon nanotubes consists of straight segments nanotubes often mixed with kinked and bending segments, which contrast the usual turbostratic and irregular CVD MWNT grown from alumina supported Fe/Mo catalyst at high ethylene flow rate.

The variation in CVD nanotube growth conditions for different catalyst sizes suggest several possible reasons for the production of MWNTs and the broader diameter distribution of carbon nanotubes grown from 9 and 13 nm catalyst particles. The activation of different sizes of catalytic iron particles is affected by the flux of carbon (i.e., the partial pressure of the hydrocarbon gas) in the CVD reaction. As the size of the catalytic particle increases from 3 nm to 9 nm to 13 nm, increasing ethylene partial pressure from 0.5% to 9% to 18% is necessary for the optimal growth of carbon nanotubes at 800° C. Otherwise little or no carbon nanotube growth is observed. At large flux carbon source (ethylene partial pressure >9%), thin-walled MWNTs were favored over SWNTs to grow from large diameter (>7 nm) catalyst particles. As the 9 nm and 13 nm iron particles have larger surface area (10×–20×) than that of a 3 nm iron particle, in the presence of a large supply of carbon source, the increase in the surface area of a large diameter particle may have promoted the growth of large MWNTs with wider range of diameters than the range of tubes produced by 3 nm particles. Similar trends had been observed with alumina supported Fe/Mo catalyst which have a wide range of catalytic particle size. Although not with explicit controlled particle sizes, this type of catalyst can selectively catalyze the growth of SWNTs at low ethylene concentration and large MWNTs at high ethylene concentration.

Consideration of the thermodynamics of growth and the details of the reaction conditions may shed some light on the observed growth of mainly large MWNTs from large diameter catalytic particles. The van der Waals interactions between MWNT shells are predicted by theoretical calculations to lower the energy of the as-grown structures. With a larger carbon flux during the CVD step, large catalytic particles may have enough carbon supply to preferably grow large carbon nanotubes over small ones which require more energy to compensate for the strain energy associated with their high curvature. Hence, the growth of thin-walled MWNTs from the large catalytic particles with limited carbon source supply may be thermodynamically favored.

Figure 9A:
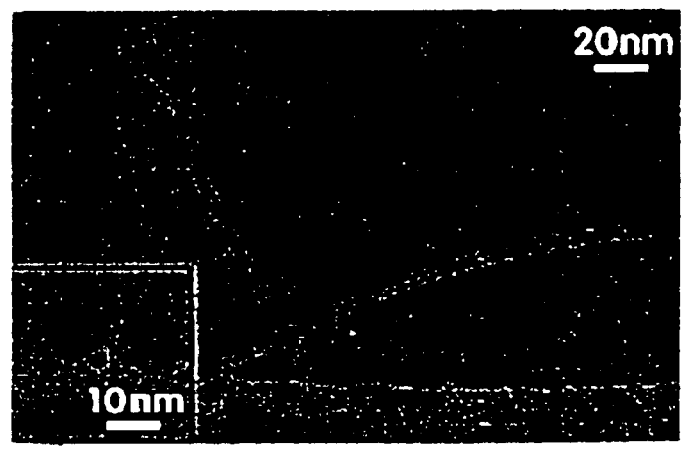
FIG. 9 depicts iron catalytic nanoparticles produced by solution-phase synthesis. TEM micrographs show that the as-produced iron particles are uniform in size (a), b), and c)). Next to the micrographs are the corresponding statistics from TEM and AFM data. The diameter distributions of 3 different sizes of iron colloid synthesized are 3.2+/−0.8 nm, 9.0+/−0.9 nm, and 12.6+/−1.7 nm (d), e) and f)) respectively with scale bars are 30 nm.
Figure 9B:
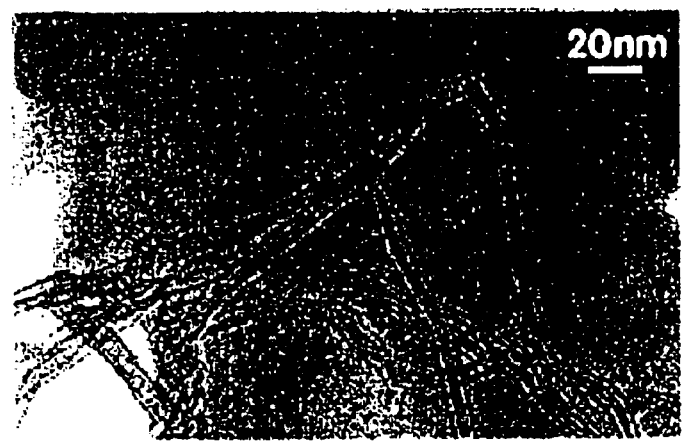
Figure 9C:
Figure 9D:
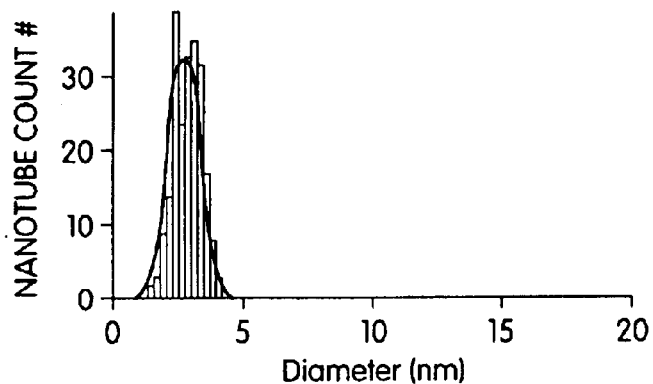
Figure 9E:
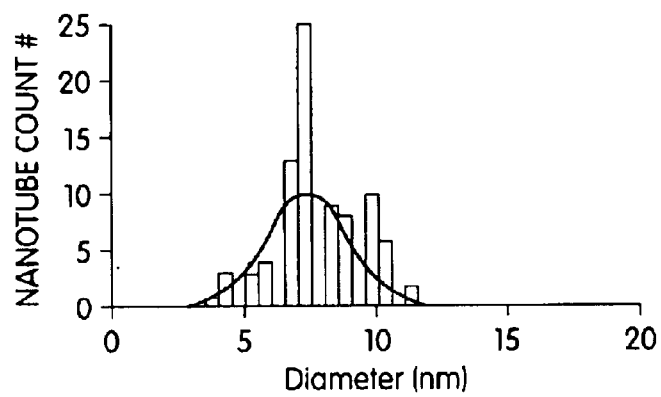
Figure 9F:
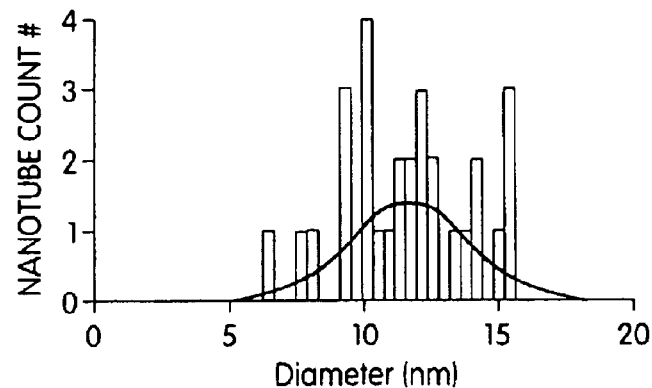

TEM studies indicate that the structures of large diameter, thin-walled carbon nanotubes produced with ethylene at 800° C. contain kinks and bending of their walls more often than smaller diameter (<5 nm) SWNTs (FIG. 9b and 9c). Sometimes the kinks and twists of these large diameter carbon nanotubes induce "ribbon-like" regions, in contrast to SWNTs of less than 5 nm in diameter. This experimental observation agrees with theoretical predictions that the structures of SWNTs and thin-walled MWNTs of large diameters can be unstable. Because the van der Waals interactions between the opposite walls can be stronger than the structure reinforced force due to the cylindrical shape of the carbon nanotube, the graphene walls may collapse, especially under mild stress and strain. The presence of these highly strained structures in the as-grown large SWNTs/MWNTs without fractures further confirms the robustness of these CVD grown nanotubes. In contrast, vapor-grown carbon fibers break under mild strains and stress. The resulting morphology may be due to the flexibility of the thin wall of a large cylindrical tube and hence a high structural sensitivity to defects is introduced during the growth process.

Figure 10A:
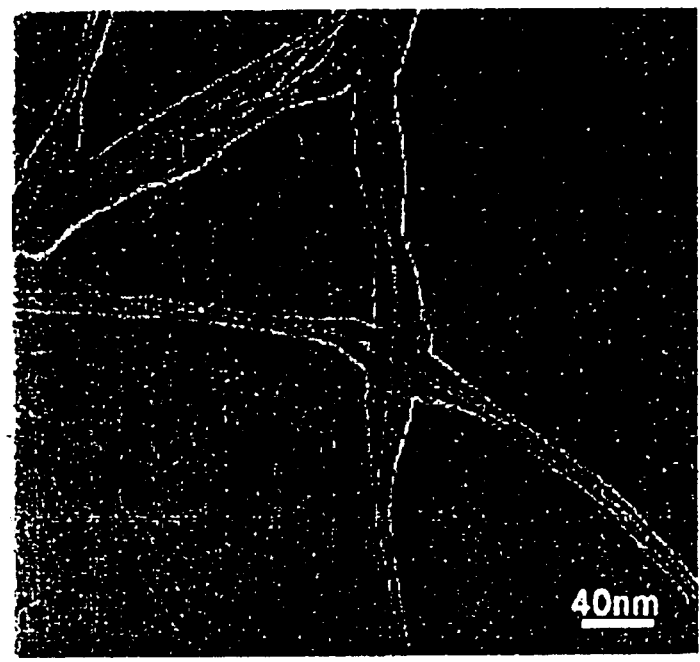
FIG. 10a depicts TEM micrographs of large diameter carbon nanotubes grown at 900 C. by CVD, with carbon nanotubes with diameter of 6.9 to 7.4 nm grown from 9.0+/−0.9 nm iron catalytic particles with ethylene.
Figure 10B:
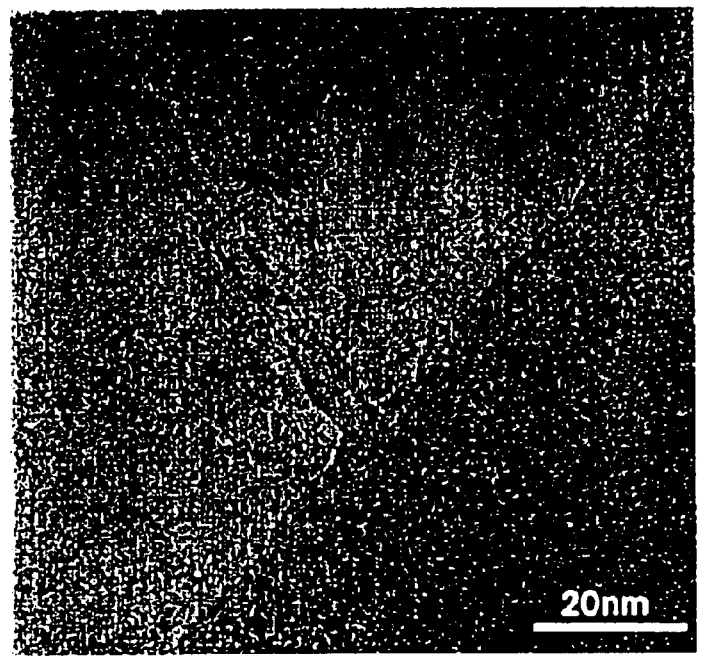
FIG. 10b depicts TEM micrographs of large diameter carbon nanotubes grown at 900 C. by CVD, with methane as the carbon source, cleaner SWNT of 5.2 nm in diameter can be synthesized from a batch of iron nanoparticles of 3–8 nm in diameter.

To promote annealing of defects during the growth process, preliminary CVD experiments with 9 nm catalytic particles at 900° C. under high ethylene partial pressure (18%) resulted in large diameter, thin-walled (2–3 walls) MWNTs with much straighter segments than those obtained at 800° C. (FIG. 10a). The amorphous carbon in the defective areas of the tubes possibly came from the pyrolysis of ethylene in the gas phase. For cleaner large diameter tubes, methane, which has a higher pyrolytic temperature, was used. FIG. 10b shows that a 5.2 nm SWNT catalytically synthesized using iron particles with diameters 3–8 nm.

Figure 2:
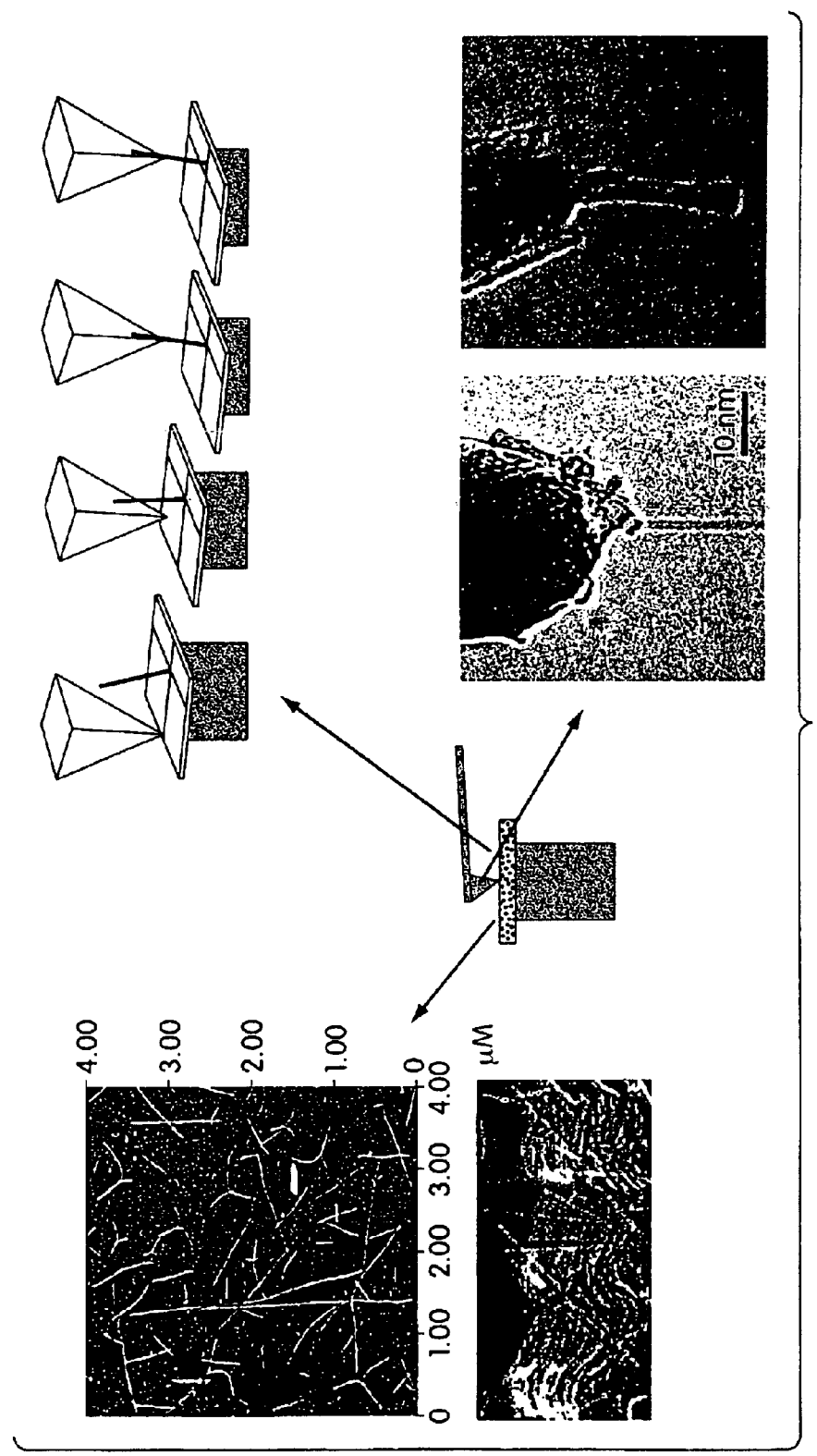
FIG. 2 depicts a model of the nanotube tip assembly process (top right panel); TEM images of SWNT tips (bottom left panels); and an AFM image of isolated nanotubes (top left).

For SWNT probe fabrication, conventional AFM tips are used to pick up nanotubes from substrates on which vertically aligned nanotubes have been grown by CVD (FIG. 2). In one embodiment, the growth of isolated SWNTs may lead to ultrahigh resolution, individual SWNT probe tips. A typical AFM image of a substrate following CVD growth (FIG. 2b) reveals very straight and isolated SWNTs with lengths of several hundred nanometers. For example, FIG. 2b shows the average diameter of the SWNTs determined from AFM height measurements where this sample is 2.2+/−0.5 nm. In one embodiment, the diameter ranges from 0.7 to 3 nm, which depends on catalyst and growth conditions.

While imaging the wafers, the sample z-position often jumps to a lower value with a step size of about 10 to about 100 nm. This corresponds to the pyramidal AFM tip coming into contact with a vertical nanotube and the nanotube becoming attached to the tip. Nanotube tips are fabricated by imaging the nanotube-covered wafers in tapping mode with a silicon tip using a Nanoscope III (Digital Instruments, Santa Barbara, Calif.). Force calibration curves were recorded on a clean silicon wafer to assess nanotube buckling behavior, and then 10–20 V, 50 μs pulses were applied to the tip while imaging in tapping mode to shorten the tip. The force calibration curve was checked again after removing approximately 20 nm and this sequence was repeated until the desired length was produced. The result is an effectively longer tip and therefore a lower sample position as depicted in FIG. 2a. These nanotube attachment events happen approximately once per 8×8 μm scan.

Further, these sub-nanometer SWNT tips can image immediately after being assembled. However, for very high-resolution imaging, they may be shortened to about 10 nm in length to avoid excessive thermal vibrations. This may carried out by a pulse etching technique recently developed that can shorten nanotube tips by lengths of only 2 nm. These nanotube tips provide resolution on Au nanocluster imaging standards, and progress is being made towards increasing their adhesion to the silicon pyramid for fluid AFM imaging. In addition to being quite simple and having essentially 100% yield, this assembly method may be carried out on advanced tips such as those with piezo controlled cantilevers or thermal sensors without the risk of damage by high temperature CVD conditions.

Although the assembled nanotube tips are capable of imaging immediately after attachment, they are usually too long for high-resolution imaging due to excessive thermal vibrations. The thermal vibration amplitude, $X_{tip}$, can be approximated by equating ½$k_B T$ with the potential energy of lateral nanotube bending:

$$X_{tip} = \sqrt{\frac{k_B T}{k_{nt}}}$$

where $k_B$ is Boltzmann's constant and T is the temperature in Kelvins. The nanotube force constant for lateral bending, $k_{nt}$, can be approximated from the continuum formula:

$$k = \frac{3\pi r^4 Y}{4l^3}$$

where r is the nanotube radius, l is the length, and Y is the Young's modulus. Using these equations and setting an upper limit of 5 Å on the vibration amplitude, it may ascertained, in one embodiment, that, for example a 3 nm diameter nanotube tip must be no more than 90 nm long, while a 0.8 nm diameter nanotube tip must be no more than 15 nm long. While these are only approximations that treat the nanotubes as solid objects with continuous properties, comparison with more rigorous calculations indicate that they are of the correct order of magnitude. In a further embodiment, high-resolution imaging requires length control of the nanotube tips with a range of about 2 nm to about 5 nm precision.

Figure 3A:
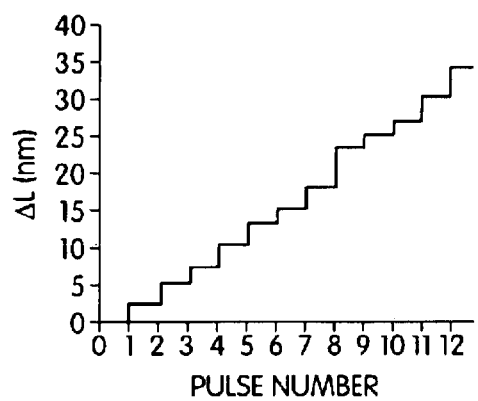
FIG. 3 depicts: (a) change in nanotube tip length after consecutive 6V pulses; (b) the etched length after pulses of increasing amplitude; and TEM images of a nanotube tip before (c) and after (d) etching. The scale bars are 20 nm.
Figure 3B:
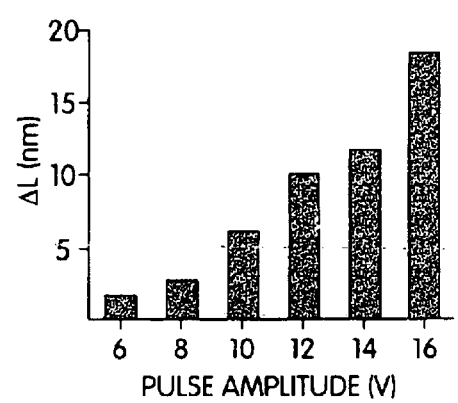
Figure 3C:
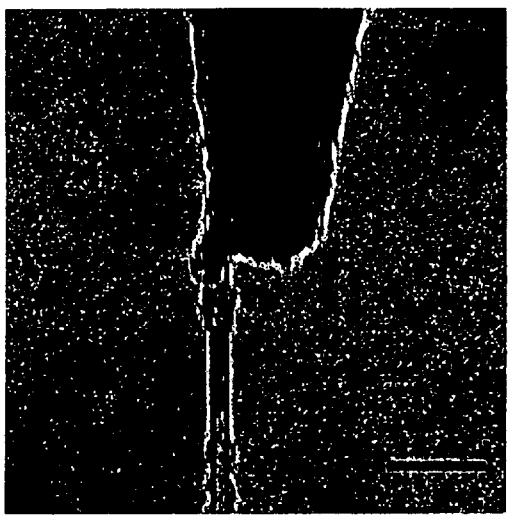
Figure 3D:
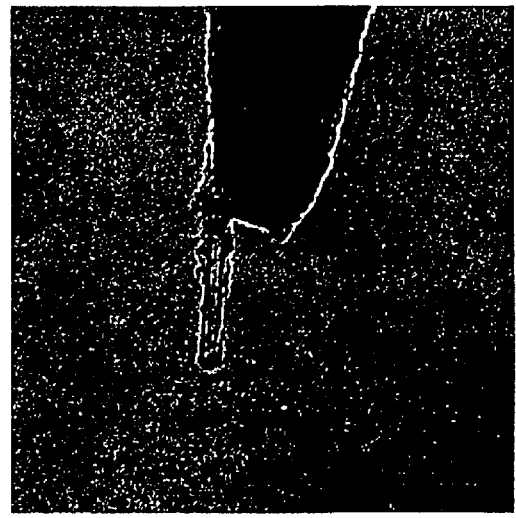

In a further embodiment, an etching technique is disclosed, in which an electrical field pulse is applied to the tip while imaging the substrate. In a particular embodiment, the etching technique uses about 10–20 V, 50 μsec pulses applied to the tip while imaging an n+ doped silicon wafer. After the pulse, the sample z-position raises to indicate etching of the nanotube tip. This method allows about 2 nm lengths to be consistently removed from the tip (FIG. 3a). In addition, the pulse amplitude may be adjusted to control the length etched (FIG. 3b). FIG. 3c and FIG. 3d demonstrate that the pulse etching leaves a clean nanotube end with TEM images of the same tip before and after etching.

Force curves are very useful means of quickly measuring nanotube tip properties. In this embodiment, raster scanning is disabled and the tip deflection is plotted versus sample position. As shown in FIG. 4a, when the nanotube comes into contact with the sample, the tip is deflected (point 1). When the force from the cantilever exceeds the nanotube's buckling force, the deflection saturates and often drops to zero as the nanotube is deformed (point 2). The deflection rises again when the silicon pyramid contacts the sample (point 3). The nanotube length is the separation between points 1 and 3, or about 15 nm in this case. This demonstrates that the nanotube/silicon adhesion of the assembled SWNT tips is sufficiently strong to observe nanotube buckling and image in air.

Figure 5A:
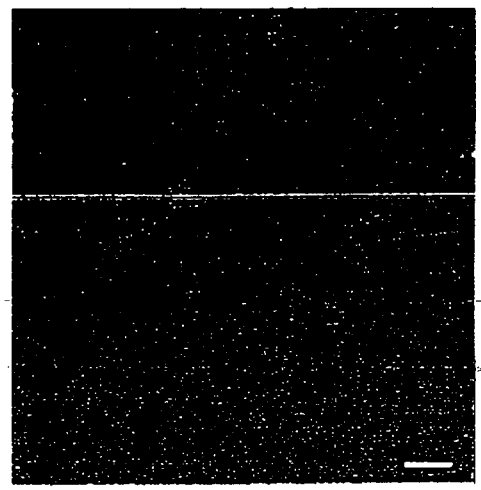
FIG. 5 depicts 5 nm gold particles imaged in air (a) and water (b) (scale bars are 10 nm); and (c) the height cross section drawn in (a).
Figure 5B:
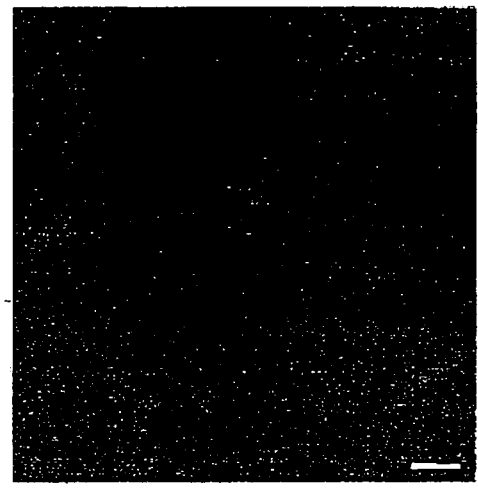
Figure 5C:
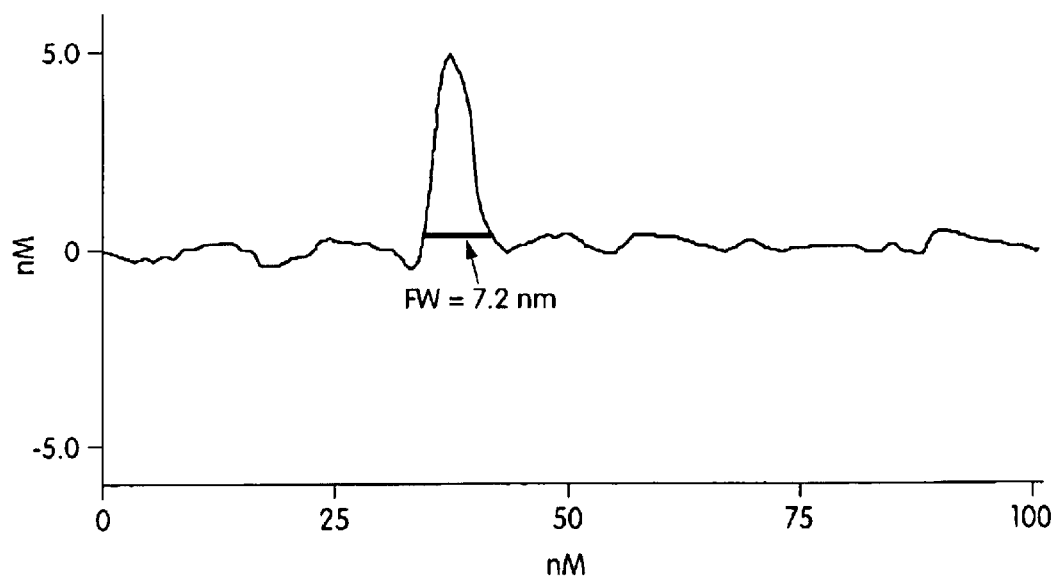

As expected, these individual SWNT tips produce high-resolution images with minimal tip-induced broadening. To demonstrate this fact, we have imaged 5 nm Au colloids that are highly incompressible and have a well-defined shape, making ideal samples for assessing the resolution of AFM tips. An image of these colloids taken in air is shown in FIG. 5. A cross section through one of the particles reveals a full width of 8 nm, indicating a 3 nm diameter nanotube tip.

While the nanotube attachment is sufficient for imaging in air, dipping the tips into fluid removes the nanotube. Importantly, the tips are often more strongly attached to the pyramid after TEM imaging. This enhanced attachment is most likely due to a thin carbon layer deposited by the TEM beam. This layer is not thick enough to be visible by TEM, however, so it should not affect the imaging resolution. Once "welded" by the TEM, the tips may be used for fluid imaging. FIG. 5b shows AFM images of gold nanoparticles taken in fluid that demonstrate the high resolution achieved with these tips.

In one embodiment, the nanotubes may be used on the tip of an AFM. In one embodiment, the nanotube tip is mechanically stable. In a further embodiment, the nanotube tips may be functionalized for chemically and/or biologically sensitive imaging, tips enhancing efforts in single molecule spectroscopy by reducing the number of functional groups at the tip and better controlling their geometry. In another embodiment, these nanotube tips may be adapted for scanning tunneling microscopy. Moreover, these tips may allow energy selective imaging as observed for $C_{60}$ absorbed STM tips. In another embodiment, more than one nanotube is attached to a tip.

For certain kinds of experiments, AFM imaging must be carried out in fluid. While the nanotube adhesion to the tip is sufficient for imaging in air, the nanotubes are usually removed when the tips are dipped in fluid due to the large surface tension forces. Therefore, fluid imaging with nanotube tips will require enhanced adhesion between the nanotube and silicon cantilever.

In one embodiment, a thin layer, for example, about. 5 nm of an adhesive is applied to the surface of a commercial silicon tip by dipping it into a solution of the glue diluted in an appropriate organic solvent (for example toluene, 10–50 times dilution). A single component adhesive may be used which does not instantly cure due to exposure to air or moisture, and which can withstand exposure to water once cured. In one embodiment, the adhesive is UV-cured adhesive. In a particular embodiment, UV-cure (NOA #63, Norland Optical Adhesives) and heat-cured (EP19HT, Master Bond, Inc.) epoxies are used. These procedures may increase the adhesion between the nanotube and commercial silicon tip as evidenced by (1) force-distance curves which directly measure the adhesion by measuring the force required to slide the nanotube along the silicon surface, (2) the observation that the tips can be dipped in and out of fluid with the nanotube still attached, and (3) these nanotube tips imaged in water have been prepared in this manner.

EXEMPLIFICATION

The invention now being generally described, it will be more readily understood by reference to the following examples, which are included merely for purposes of illustration of certain aspects and embodiments of the present invention, and are not intended to limit the invention.

Example 1

High Yield Fabrication of Individual Single-Walled Nanotube Probe Tips for Atomic Force Microscopy Substrates for vertical nanotube growth were prepared from $n^+$ doped silicon wafers oxidized at 600 C. for 20 minutes in oxygen. A 150 $\mu$g/mL solution of ferric nitrate nonahydrate in isopropanol was prepared and stirred for 2 minutes. The wafers were dipped in this solution for 10 seconds, rinsed in hexane, and dried. For nanotube growth, a catalytic wafer was placed in a 1-inch quartz tube furnace and purged with 600 standard cubic centimeter per second (sccm) argon, 400 sccm hydrogen, and 0.5 sccm ethylene for 5 minutes. The ethylene flow was reduced to zero and the substrate was annealed at 700 C. for 15 minutes under argon and hydrogen. The ethylene flow was then turned on at 0.5 sccm for 6 minutes of nanotube growth. Finally, the hydrogen and ethylene flows were turned off and the furnace cooled under argon.

The CVD reaction results in the growth of straight SWNT with lengths of several hundred nanometers. FIG. 1 shows an AFM image of several such nanotubes on the surface. Typical diameters, as measured by AFM, are 0.8 to 3 nm.

Example 2

Attachment of Nanotube to AFM Tip

While imaging the wafers, the sample z-position often jumps to a lower value with a step size of about 10 to about 100 nm. This corresponds to the pyramidal AFM tip coming into contact with a vertical nanotube and the nanotube becoming attached to the tip. Nanotube tips are fabricated by imaging the nanotube-covered wafers in tapping mode with a silicon tip using a Nanoscope III (Digital Instruments, Santa Barbara, Calif.). Force calibration curves were recorded on a clean silicon wafer to assess nanotube buckling behavior, and then 10–20 V, 50 $\mu$sec pulses were applied to the tip while imaging in tapping mode to shorten the tip. The force calibration curve was checked again after removing approximately 20 nm and this sequence was repeated until the desired length was produced. The result is an effectively longer tip and therefore a lower sample position as depicted in FIG. 2a. These nanotube attachment events happen approximately once per 8×8 $\mu$m scan. TEM observations of the AFM tips after such an event reveal that this process produces individual SWNT tips. The length of the nanotube extending from the tip apex is similar to the z-position step height, and the nanotube diameter range measured by TEM matches that measured by AFM of the nanotubes lying flat on the surface. The nanotube tips fabricated in this way are remarkably well aligned. Typical SWNT tips that cover the observed diameter range are shown in FIG. 2b and FIG. 2.

Figure 4:
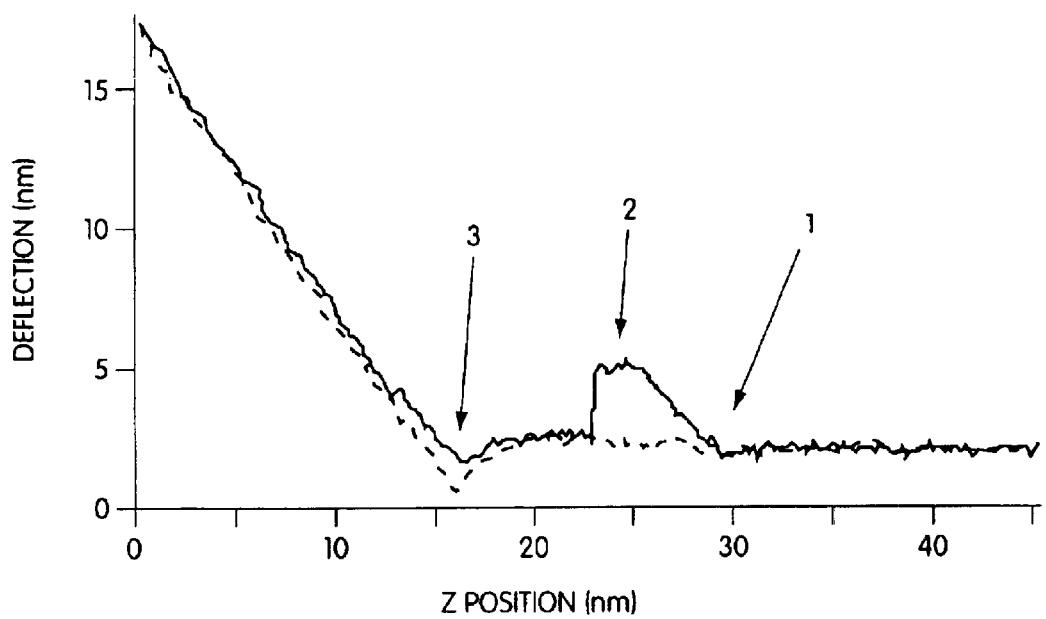
FIG. 4 depicts a force calibration curve that demonstrates nanotube tip buckling: at point 1 the nanotube first hits the surface; at point 2 the nanotube buckles; and at point 3 the silicon pyramid hits the surface.

To assess the properties of the SWNT tip in situ, the deflection versus tip sample separation has been measured. (FIG. 4). When the nanotube first comes into contact with the sample, the tip is deflected (point 1). As the tip-sample separation is further reduced the applied force will exceed the nanotubes buckling force. At this point (point 2), the deflection saturates and often drops to zero as the nanotube is deformed. Ultimately, the silicon pyramid contacts the sample (point 3) and the deflection increases again. The nanotube length corresponds to the separation between points 1 and 3 is about 12 nm for the tip measured in FIG. 2c. The fact that the deflection-separation curves can be repeated multiple times demonstrates that these nanotube tips are highly robust and have a sufficiently large nanotube/silicon adhesion for routine imaging.

Example 3

Synthesis of Iron Colloid Particles

Catalytic iron colloid particles of 3 nm (3.2+/−0.8), 9 nm (9.0+/−0.9) and 13 nm (12.6+/−1.7) diameters were synthesized by thermal decomposition of iron pentacarbonyl (Fe(CO)$_5$) in the presence of alkanoic acid or alkenoic acid ligands at the reflux temperature of the organic solvent, with modification to published methods. Typically, for the synthesis of 3 nm iron particles, 1.18 g (5 mmole) of Fe(CO)$_5$ was first added to 15.4 ml of 66 mM oleic acid (1 mmole) in 1,2-dichlorobenzene at 110° C. under nitrogen. The resulting solution was then refluxed at 180° C. for 1 hour to facilitate a thorough decomposition of the organometallic iron. For the synthesis of 9 nm iron particles, 197 mg (1 mmole) of Fe(CO)$_5$ was added to 5 ml of 0.5 M lauric acid (2.5 mmole) in dioctyl ether at 110° C. under nitrogen, followed by refluxing at 270° C. for 2 hours. The synthesis of 12 nm iron particles was similar to the one for 9 nm iron particles, except that same molar ratio of octanoic acid was used instead of lauric acid and the refluxing time was extended to 3 hours. A wider range of iron particles with diameters from 3–8 nm was also synthesized with oleylamine and oleic acid in a method similar to those above.

Example 4

Growth of Carbon Nanotubes with Iron Colloid Particles

The growth of carbon nanotubes was carried out by CVD with different sizes of catalytic iron particles. The substrates used were silicon wafers (Silicon Sense, Nashua) and force modulation silicon atomic force microscopy probes (Digital Instruments, Santa Barbara) which were previously oxidized at 600° C. for 10 minutes in a flow of oxygen. For catalyst deposition, the substrates were dipped into a 10× to 50× dilution of Fe particles samples in toluene for 10 seconds, followed by a rinse of hexane. Typically, for the growth of carbon nanotubes with c.a. 3 nm diameter, the substrates with c.a. 3 nm Fe particles were placed in a 1-inch quartz tube furnace and were annealed under 600 standard cubic centimeter per minute (sccm) of argon and 400 sccm of hydrogen at 800° C. for 5 minutes, followed by the addition of ethylene at 5 sccm for 10 minutes. Lastly, the substrates were cooled under argon. CVD conditions for growth with 9 nm and 12 nm Fe particles are similar, except that 100 sccm and 200 sccm of ethylene were used respectively. To test the effect of temperature in annealing the structures of as-grown large diameter carbon nanotubes from 9 nm Fe particles, similar experiments were carried out with 200 sccm ethylene or 3000 sccm methane at 900° C. instead.

Example 5

Characterization of Nanotubes

Transmission electron microscopy (TEM) with a Philips EM420 (FEI, Horosboro) and atomic force microscopy (AFM) with a Nanoscope IIIa (Digital Instrument, Santa Barbara) were carried out to determine the size distribution and morphology of the iron particles and as-grown carbon nanotubes. For TEM studies, samples either were dispersed on holey carbon grids or on silicon cantilevers mounted on a custom made TEM holder. For AFM studies, samples were dispersed on flat silicon wafers and imaged by tapping mode.

Example 6

Nanotube Tip Adhesion

This Example outlines three strategies for increasing the nanotube-tip adhesion of carbon nanotube tips for AFM.

Delayed-Cure Gluing

In this strategy, a thin layer (ca. 5 nm) of an adhesive is applied to the surface of a commercial silicon tip by dipping it into a solution of the glue diluted in an appropriate organic solvent (we used toluene, 10–50 times dilution). UV-cure (NOA #63, Norland Optical Adhesives) and heat-cured (EP19HT, Master Bond, Inc.) epoxies are used. A carbon nanotube is then attached to the silicon tip by the "pick up" procedure. The glue is then cured by UV exposure (30 minutes under a UVGL 25 Mineralight Lamp, 366 nm radiation, UVP, Inc.) or by heating (150 C. in air for 2 hours).

Electron Beam Deposition

Figure 11:
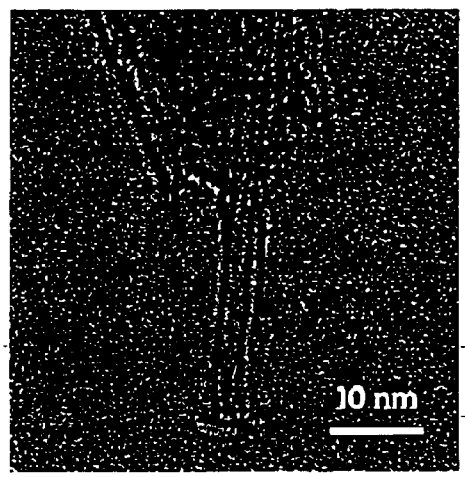
FIG. 11 depicts a view seen in the TEM during the electron beam deposition process.

Carbon deposition may also be used to increase nanotub-tip adhesion. Nanotube tips are fabricated by the pickup method, then imaged in a Phillips EM 420 transmission electron microscope (100 kV beam, several minutes of high magnification exposure at 300,000×. These procedures may increase the adhesion between the nanotube and commercial silicon tip as evidenced by (1) force-distance curves which directly measure the adhesion by measuring the force required to slide the nanotube along the silicon surface, (2) the observation that the tips can be dipped in and out of fluid with the nanotube still attached, and (3) images in water with nanotube tips prepared in this manner are shown in FIG. 11.

Nanotube Fusing

Figure 12:
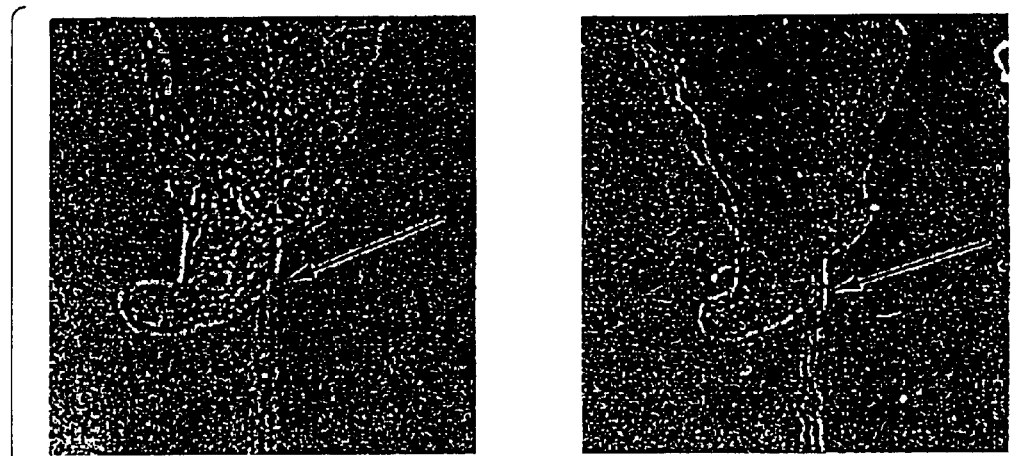
FIG. 12 shows evidence of silicon diffusion in TEM images taken before and after the high temperature reaction resulting in nanotip fusion.
Figure 13:
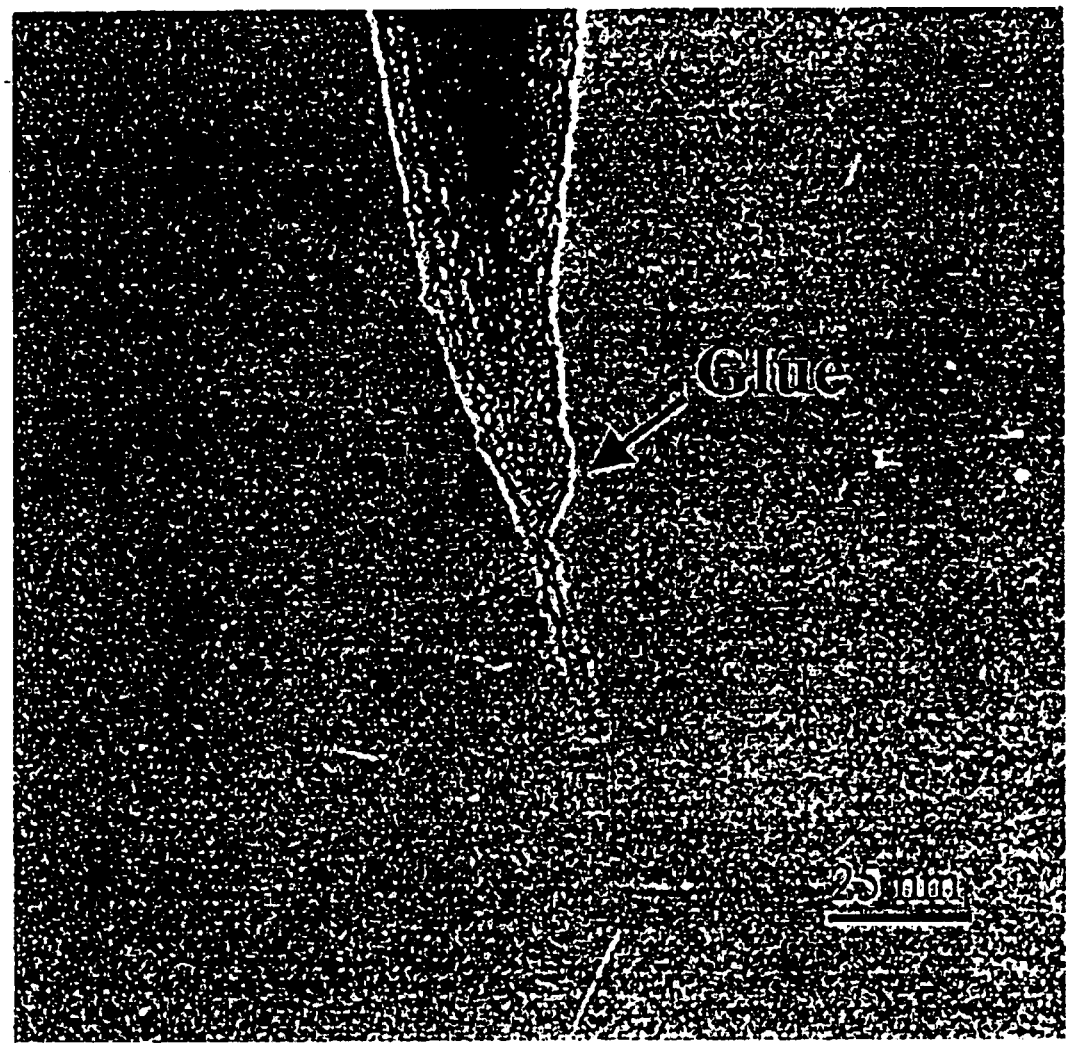
FIG. 13 shows a glued individual SWNT nanotip.

Carbon nanotubes in contact with silicon are heated to sufficient temperature, silicon atoms diffuse to the carbon-silicon interface and form silicon carbide. This high temperature solid—solid reaction technique may be used to increase the adhesion between carbon nanotubes and commercial silicon AFM tips. Nanotube tips may be fabricated by the pickup method and heated to 900–1000 C. in a 1-inch quartz tube furnace under an inert argon atmosphere for 20 minutes. Evidence of silicon diffusion can be seen in TEM images taken before and after the high temperature reaction—FIG. 12 (see arrow). Evidence of increased adhesion from force-distance curves which directly measure the force required to slide the nanotube along the silicon surface may also be noted.

Incorporation by Reference

All of the patents and publications cited herein are hereby incorporated by reference.

Equivalents

Those skilled in the art will recognize, or be able to ascertain using no more than routine experimentation, many equivalents to the specific embodiments of the invention described herein. Such equivalents are intended to be encompassed by the following claims.

We claim:

1. A method of fabricating a SWNT probe for use in atomic force microscopy, comprising:
    growing SWNTs on a substrate using chemical vapor deposition;
    imaging said substrate using an atomic force microscope comprising a tip;
    attaching one of said SWNTs to said tip thereby producing a tip bearing a SWNT; and
    heating said tip bearing a SWNT from 900 to 1000° C.; thereby fabricating the SWNT probe.

2. The method of claim 1 wherein said tip bears an adhesive.

3. The method of claim 1 wherein the substrate is a silicon wafer.

4. The method of claim 3 wherein growing the SWNTs on a silicon wafer comprises the steps of:
    depositing on said wafer a metallic catalytic material;
    placing said silicon wafer in a CVD furnace; and
    exposing said silicon wafers to a gaseous atmosphere comprising a carbon containing gas.

5. The method of claim 4 wherein the metallic catalytic material is selected from the group consisting of metals, metal oxides, metallic salts, and metallic particles.

6. The method of claim 4 wherein the metallic catalytic material is in solution.

7. The method of claim 6 wherein the metallic catalytic material is selected from the group consisting of ferric salts, nickel salts, cobalt salts, platinum salts, molybdenum salts, and ruthenium salts.

8. The method of claim 7 wherein the metallic catalytic material is ferric nitrate.

9. The method of claim 6 wherein the solution comprises an alcohol.

10. The method of claim 9 wherein the alcohol is selected from the group consisting of methanol, ethanol, and isopropanol.

11. The method of claim 10 wherein the alcohol is isopropanol.

12. The method of claim 4 wherein the carbon containing gas is ethylene.

13. The method of claim 9 wherein the carbon containing gas is ethylene, the metallic catalytic material is ferric nitrate, and the alcohol is isopropanol.

14. The method of claim 3 wherein growing the SWNTs on a silicon wafer comprises the steps of:
   treating said silicon wafer with metallic colloid particles;
   placing said silicon wafer in a CVD furnace; and
   exposing said silicon wafers to a gaseous atmosphere comprising a carbon containing gas.

15. The method of claim 14 wherein the metallic is selected from the group consisting of iron colloids, nickel colloids, cobalt colloids, platinum colloids, molybdenum colloids, and ruthenium colloids.

16. The method of claim 15 wherein the metallic colloid is an iron colloid.

17. The method of claim 14 wherein the carbon containing gas is ethylene.

18. The method of claim 14 wherein the metallic colloids have diameters of about 3–15 nm.

19. The method of claim 1 wherein the SWNT has a diameter from about 2 nm to about 13 nm.

20. The method of claim 1, wherein the SWNT has a diameter from about 2 nm to about 9 nm.

21. The method of claim 1 wherein the SWNT has a diameter from about 3 nm to about 5 nm.

* * * * *